(12) United States Patent
Fink et al.

(10) Patent No.: US 9,544,049 B2
(45) Date of Patent: Jan. 10, 2017

(54) FIBRE NETWORK COMPRISING SENSORS

(71) Applicant: 3M INNOVATIVE PROPERTIES COMPANY, St. Paul, MN (US)

(72) Inventors: Johannes Fink, Bergheim (DE); Manfred Bauer, Wuppertal (DE); Ulrich Lutterkordt, Wuppertal (DE); Michael Bake, Bochum (DE); Friedrich W. Denter, Castrop-Rauxel (DE); Manfred Stieglitz, Wuppertal (DE); Michael Mansholt, Köln (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/432,546

(22) PCT Filed: Oct. 2, 2013

(86) PCT No.: PCT/US2013/063039
§ 371 (c)(1),
(2) Date: Mar. 31, 2015

(87) PCT Pub. No.: WO2014/066000
PCT Pub. Date: May 1, 2014

(65) Prior Publication Data
US 2015/0270895 A1 Sep. 24, 2015

(30) Foreign Application Priority Data

Oct. 25, 2012 (EP) ..................................... 12189913

(51) Int. Cl.
*H04B 10/071* (2013.01)
*H04J 14/02* (2006.01)
(Continued)

(52) U.S. Cl.
CPC ......... *H04B 10/071* (2013.01); *H04J 14/0227* (2013.01); *H04L 43/12* (2013.01);
(Continued)

(58) Field of Classification Search
CPC ............... H04B 10/071; H04J 14/0227; H04Q 11/0067; H04Q 2001/0083; H04Q 2001/0016; H04L 43/12
(Continued)

(56) References Cited

U.S. PATENT DOCUMENTS 6,850,706 B2   2/2005   Jager
7,283,743 B2 *  10/2007   Matz ................... H04B 10/032
                                                               380/256

(Continued)

FOREIGN PATENT DOCUMENTS

CN   101321022 A   12/2008
CN   101715153 A    5/2010
(Continued)

OTHER PUBLICATIONS

Bownass, et al., "Serially Multiplexed Point Sensor for the Detection of High Humidity in Passive Optical Networks", *Optics Letters* (Mar. 1, 1997); vol. 22, No. 5; pp. 346-348.

(Continued)

*Primary Examiner* — Dalzid Singh
(74) *Attorney, Agent, or Firm* — Gregg H. Rosenblatt

(57) ABSTRACT

Fiber network for interrogating fiber-optic sensors in a first Passive Optical Network (PON) and in a second PON, the fiber network comprising a test signal transceiver for emitting query signals and for receiving response signals, a first PON and a second PON. Each PON comprises a light source for generating telecommunication signals and a fiber-optic sensor. Each PON can transmit the telecommunication signals to a plurality of subscribers, and is optically connected (Continued)

to the test signal transceiver such that the query signals can be fed into the respective PON and propagate in the PON to the fiber-optic sensor, and such that the test signal transceiver can receive response signals from the fiber-optic sensor through the PON. The fiber network further comprises a query signal splitter, optically connected to the test signal transceiver and to the PONs such that it can feed a query signal into the PONs simultaneously, and such that it can feed response signals from the PONs into the test signal transceiver.

11 Claims, 5 Drawing Sheets

(51) Int. Cl.
*H04L 12/26* (2006.01)
*H04Q 11/00* (2006.01)

(52) U.S. Cl.
CPC . *H04Q 11/0067* (2013.01); *H04Q 2011/0016* (2013.01); *H04Q 2011/0083* (2013.01)

(58) Field of Classification Search
USPC .......................................................... 398/16
See application file for complete search history.

(56) References Cited

U.S. PATENT DOCUMENTS

| | | | |
|---|---|---|---|
| 7,852,213 B2 | 12/2010 | Browning, Jr. | |
| 7,956,316 B2 | 6/2011 | Browning, Jr. | |
| 8,588,571 B1 | 11/2013 | Lam | |
| 8,655,167 B1* | 2/2014 | Lam | H04B 10/071 398/16 |
| 8,693,866 B1 | 4/2014 | Lam | |
| 8,781,322 B2 | 7/2014 | Lam | |
| 9,042,723 B2* | 5/2015 | Dahlfort | G01M 11/3136 398/10 |
| 2008/0031624 A1* | 2/2008 | Smith | H04B 10/071 398/71 |
| 2008/0063338 A1 | 3/2008 | Kachmar | |
| 2011/0033187 A1* | 2/2011 | Rossetti | H04J 14/02 398/79 |
| 2011/0255860 A1* | 10/2011 | Lee | G01M 11/3136 398/12 |
| 2011/0268438 A1* | 11/2011 | Daems | H04B 10/071 398/16 |
| 2012/0039598 A1 | 2/2012 | Dahlfort | |
| 2013/0028289 A1* | 1/2013 | Zhang | G01K 11/32 374/161 |
| 2013/0259469 A1* | 10/2013 | Smith | H04J 14/0227 398/16 |
| 2013/0268471 A1* | 10/2013 | Appuhamillage | G01M 11/083 706/17 |

FOREIGN PATENT DOCUMENTS

| | | |
|---|---|---|
| CN | 201887788 | 6/2011 |
| EP | 1980834 | 10/2008 |
| EP | 2264420 | 12/2010 |
| JP | 2005-221713 | 8/2005 |
| JP | 2010-212767 | 9/2010 |
| RU | 2240245 C1 | 11/2004 |
| RU | 2282229 C1 | 8/2006 |
| WO | WO 2010-076567 | 7/2010 |
| WO | WO 2010-126427 | 11/2010 |

OTHER PUBLICATIONS

Hann, "Monitoring technique for a hybrid PS/WDM-PON by using a tunable OTDR and FBGs;" Measurement Science and Technology, Institute of Physics Publishing, May 1, 2006, vol. 17, No. 5, pp. 1070-1074.

International Search report for PCT International Application Number, PCT/US2013/063039 mailed on Nov. 8, 2013, 4 pages.

Search Report for CN Appl. No. 201380055871.7, mailed on May 27, 2016, 2 pp.

Search Report for RU Appl. No. 2015111648, mailed on Apr. 3, 2016, 2 pp.

* cited by examiner

FIBRE NETWORK COMPRISING SENSORS

BACKGROUND OF THE INVENTION

Field of the Invention

The invention relates to a fibre network comprising passive optical networks and sensors.

Background

Passive optical networks are used to transmit optical signals through optical fibres. In passive optical telecommunications networks, optical telecommunication signals are transmitted from a central office of a telecom provider to a number of telecommunications customers or subscribers. A typical passive optical network ("PON") connects approximately thirty subscribers to the central office, but PONs connecting fewer or many more subscribers exist as well. A typical PON comprises a combined light source/detector device, sometimes called an "Optical Light Terminal" ("OLT"), optical fibres, splitters and optical network units ("ONUs") at the subscriber locations. The OLT generates telecommunication signals which are transmitted through the optical fibres to the subscribers connected to the PON, and it receives telecommunication signals from the subscribers. At one or two stages of a typical PON, an optical splitter splits the signal of one fibre into several signals which are transmitted in separate optical fibres. Telecommunication signals are thereby cascaded to the ONUs of several subscribers. In order to provide thousands of subscribers with telecommunication services, a great number of PONs are required, each transmitting separate telecommunication signals from the central office to a number of subscribers.

In order to detect external effects like, for example, damage, vandalism, unauthorized access to elements of a PON, or environmental effects, some PONs comprise fibre-optic sensors. These sensors are mostly passive sensors, i.e. they do not require electrical energy to operate. Such fibre-optic sensors are often connected to a central office of the network operator through optical fibres of the PON, either through dedicated sensor fibres, which do not carry an additional communication signal ("dark fibres"), or through fibres that are used for the transmission of communication signals. In response to an external effect, such fibre-optic sensors can modify e.g. the attenuation of the fibre via which they are connected to the central office. Fibre-optic sensors in a PON can be interrogated or "read" by a test signal transceiver, for example by an Optical Time Domain Reflectometer ("OTDR"). For reading a fibre-optic sensor, the OTDR emits an optical query signal into the PON, and measures the intensity of a response signal, which originates from the query signal. Query signals and/or response signals may be called test signals. In order to obtain a stronger response signal, a fibre through which a fibre-optic sensor is connected to other elements of the PON (a "sensor fibre") is often equipped with a reflector, placed at the end of the sensor fibre and in the vicinity of the sensor. The response signal then originates from the modification, e.g. attenuation, of the query signal by the sensor. In a "normal" state of the fibre-optic sensor, the response signal has, for example, an intensity of 100%, while in an "activated" state of the sensor, the response signal has an intensity of 30%. The time delay between the emission of the query signal and the arrival of the response signal at the OTDR indicates the position of the fibre-optic sensor in the PON and can be used to identify a specific sensor. Interrogating fibre-optic sensors in a PON with such an OTDR technique is advantageous because OTDRs are traditionally used to locate fibre faults in fibre-optic networks and specifically in PONs. This traditional process of locating a fibre fault makes use of the fact that where a fibre is damaged, i.e. at a fibre fault, the signal transmission of the fibre is reduced, and the attenuation is high. The OTDR query signal is thus attenuated at the fibre fault, and the response signal is weaker than a response signal from an undamaged fibre. The OTDR determines the position of the fibre fault from the time delay between emission of the query signal and the receipt of the response signal. A fast OTDR measurement takes about one second, because the OTDR requires a certain amount of time for receiving the response signal and for subsequent data processing. However, due to dynamic range limitations, standard OTDR measurements for fibre fault location take significantly longer, since numerous individual measurements must be performed and averaged. Since fibre faults occur rarely, this time delay is normally not critical. The same OTDR device and the same technique can, in principle, be used to interrogate fibre-optic sensors in PONs.

Some fibre-optic sensors in a PON can be interrogated infrequently, for example a flooding sensor as described in the Japanese patent document JP 2010-212767 A2. Such sensors can therefore be interrogated using traditional, "slow" techniques for monitoring the fibres of a PON. One of those traditional "slow" fibre monitoring techniques is described in the European patent application EP 1980834 A1, where a network monitoring unit determines a failed fibre, and an optical switch is used to select the optical fibre to be tested. An OTDR launches an optical pulse signal into the optical fibre via the optical switch, and receives returning light reflected from reflectors in ONUs of the PON in which the failed fibre is located. It is stated in the document that it takes about 90 seconds per PON to carry out one measurement with a sufficiently high signal-to-noise ratio for easy determination of a point of rupture of the fibre.

In order to protect the network infrastructure effectively, some sensors in a PON must be interrogated more frequently. For example, a sensor for detecting the opening of a door of a splice cabinet of a PON must be read not less frequently than about every 5 to 10 seconds. Otherwise, the door might be opened, an unauthorized activity done in the cabinet, and the door be closed again between two interrogations of the sensor, in which case the opening and closing of the door would remain unnoticed. The traditional technique of optically connecting one test signal transceiver, specifically an OTDR, to one PON via a switch, interrogating the sensors in the PON, then connecting the OTDR to a next PON and interrogating the sensors in this next PON, and so on, until all PONs have been connected to the OTDR and all sensors have been read, cannot provide a frequent-enough interrogation of a specific sensor in a specific PON. On the other hand it would be a very expensive solution to connect a dedicated test signal transceiver, e.g. an OTDR, to each PON, in order to read all sensors frequently enough. It is desirable to interrogate fibre-optic sensors in two or more PONs at a high frequency and using only a single test signal transceiver. The present disclosure seeks to address this problem.

SUMMARY

The invention in the present disclosure provides a fibre network for interrogating fibre-optic sensors in a first Passive Optical Network (PON) and in a second PON, the fibre network comprising a test signal transceiver for emitting query signals and for receiving response signals, wherein the response signals originate from the query signals, a first PON comprising a first light source for generating first telecommunication signals and comprising a first fibre-optic sensor, wherein the first PON is adapted to transmit the first telecommunication signals to a plurality of subscribers, and wherein the first PON is optically connected to the test signal transceiver such that query signals from the test signal transceiver can be fed into the first PON and propagate in the first PON to the first fibre-optic sensor, and such that the test signal transceiver can receive response signals from the first fibre-optic sensor through the first PON, a second PON comprising a second light source for generating second telecommunication signals and comprising a second fibre-optic sensor, wherein the second PON is adapted to transmit the second telecommunication signals to a plurality of subscribers, and wherein the second PON is optically connected to the test signal transceiver such that query signals from the test signal transceiver can be fed into the second PON and propagate in the second PON to the second fibre-optic sensor, and such that the test signal transceiver can receive response signals from the second fibre-optic sensor through the second PON, characterized in that the fibre network further comprises a query signal splitter, for feeding a query signal, emitted by the test signal transceiver, into the first PON and the second PON simultaneously, and for feeding response signals from the first PON and second PON into the test signal transceiver, wherein the query signal splitter is optically connected to the test signal transceiver and to the first and second PONs such that the query signal splitter can feed a query signal, emitted by the test signal transceiver, into the first PON and the second PON simultaneously, and such that the query signal splitter can feed response signals from the first PON and second PON into the test signal transceiver.

The fibre network according to the disclosure addresses the problem of frequent sensor interrogation stated above by interrogating fibre-optic sensors in two (or more) PONs simultaneously by a single test signal transceiver. The test signal transceiver may, for example, be an optical time domain reflectometer ("OTDR"). Interrogation of a fibre-optic sensor, in the context of this disclosure, means sending a query signal to that sensor and receiving a response signal from that sensor. In traditional fibre networks, sensors in a plurality of PONs, connected to one test signal transceiver, were interrogated sequentially, e.g. by using an optical switch, to connect the test signal transceiver to one PON after the other. In a fibre network according to the disclosure, i.e. a fibre network having a query signal splitter to which two PONs are optically connected, a test signal transceiver can send query signals into the PONs simultaneously and receive response signals without having to operate a switch. Simultaneous interrogation of fibre-optic sensors in different PONs allows higher interrogation frequencies with a single test signal transceiver than sequential interrogation. Simultaneous interrogation is made possible by the use of a query signal splitter.

A test signal transceiver, e.g. an OTDR, emits optical signals, "query signals", of a certain wavelength composition and of a certain signal shape over time into an optical fibre. The query signal may have a specific wavelength, it may comprise two or more discrete wavelengths, or it may have a specific wavelength spectrum, in which one or more wavelengths have a considerably higher intensity than the remaining wavelengths. The query signal is generally modified when travelling through the fibre, e.g. it may be attenuated and/or partially be scattered back when propagating in the fibre, it may be partially reflected at fibre defects, it may be attenuated where the fibre is bent below a certain radius, or it may be partially or completely reflected at a fibre end. The test signal transceiver detects signals coming back from the fibre in response to the query signal, i.e. "response signals". Each response signal originates from a query signal, as it is formed by modification, e.g., attenuation, scattering, reflection, or spectral modification, of the query signal. The test signal transceiver receives the response signals and may analyze them. It may, for example, determine the time delay between emission of the query signal and the arrival of a response signal, or determine the intensity, duration or shape of the response signal over time, or the spectral composition of the response signal. Such parameters allow to determine properties of the fibre or the fibres through which the query signal and the associated response signal travelled between emission and arrival at the test signal transceiver. Such parameters may also allow to determine properties of any sensor or sensors located along the fibre.

The PONs in the fibre network of the present disclosure are used for telecommunication purposes. They comprise respective light sources, which can generate telecommunication signals. The light sources may be Optical Light Terminals (OLTs), which may also be operable to receive optical telecommunication signals. PONs may further comprise, for example, optical fibres, splitters, reflectors, fibre-optic sensors, wavelength division multiplexers, or Optical Network Units (ONUs). The PONs are adapted to transmit the telecommunication signals from the light source, located for example in a central office, through optical fibres to subscribers. At a subscriber, a fibre of the PON may be terminated with an ONU. An ONU may comprise a reflector or a reflector may be associated with the ONU. The reflector in an ONU or associated with an ONU may be of the same type as a reflector comprised in a fibre-optic sensor. A PON may be adapted to transmit telecommunication signals between subscribers and a central office, e.g. in both directions. Telecommunication signals are different from query signals and response signals, in that they are emitted by the light source of the PON, while query signals and the associated response signals are emitted by a test signal transceiver. The wavelength of a query signal and/or of a response signal may be different from the wavelengths of the telecommunication signals transmitted in the same fibres. A query signal or a response signal may have a different light wavelength spectrum, a different duration and/or a different shape over time than a telecommunication signal. The query signal and/or the response signal is thereby discernible from the telecommunication signals. A query signal and a telecommunication signal may be transmitted in a same fibre of the PON.

In a fibre network according to the present disclosure, a PON can be optically connected to the test signal transceiver, such that query signals from the test signal transceiver can be fed into the PON and propagate in the PON to a fibre-optic sensor, and such that the test signal transceiver can receive response signals from the fibre-optic sensor through the PON. In general, this optical connection between test signal transceiver and PON may be done by an optical fibre. This fibre (the "test signal fibre") is optically connected to the test signal transceiver, receives query signals from the test signal transceiver through its first end, and transmits the query signals further to its second opposed end, which may be optically connected to a further fibre, or to the input side of a signal coupling device. The signal coupling device is also optically connected to a network fibre of the PON, into which PON the query signal is to be fed. That network fibre may be adapted to transmit telecommunication signals. The signal coupling device optically combines the telecommunication signals in the network fibre and the query signal. The combined signal is transmitted further by a fibre of the PON.

The light source of a PON feeds telecommunication signals into a single fibre of the PON, the "root fibre". This root fibre may transmit the telecommunication signals to a splitter, which splits the signals and transmits them into a plurality of network fibres. The network fibres may transmit the telecommunication signals to the ONUs of individual subscribers. A PON which has only one splitter optically arranged between the end of the root fibre and any subscriber may be called a one-stage PON. Alternatively, a network fibre may transmit telecommunication signals to a second splitter, where they are split again. Further network fibres may transmit the telecommunication signals from the second splitter to the ONUs of individual subscribers. Such a PON which has two splitters optically arranged between the end of the root fibre and any subscriber may be called a two-stage PON. In both types of PON, telecommunication signals are cascaded from the root fibre to the ONUs of individual subscribers. It is advantageous to feed the query signal into the root fibre of a PON, because this arrangement allows to interrogate fibre-optic sensors in all network fibres of the PON. It is possible, however, to feed the query signal only into one branch of several branches of a PON. In that case, only sensors in that branch can be interrogated.

In general, splitters in a fibre network according to the present disclosure can not only split one incoming signal into several outgoing signals, but can also combine several incoming signals into one outgoing signal. Return telecommunication signals, transmitted by network fibres of a one-stage PON towards the OLT, may be combined by the splitter, and be fed into the root fibre of the PON, which transmits them to the OLT. Similarly, in a two-stage PON, return telecommunication signals, transmitted by several network fibres of the PON towards the OLT, may be combined by the second splitter, then by the first splitter, and be fed by the first splitter into the root fibre of the PON, which transmits them to the OLT of the PON.

The fibre network according to the present disclosure comprises a query signal splitter. The query signal splitter may be a power splitter, i.e. it may split an incoming optical signal into a plurality of outgoing optical signals of lower intensity. The outgoing signals may have essentially identical wavelength compositions.

The query signal splitter typically comprises an upstream side and a downstream side and signal ports. "Upstream" and "downstream" refer to signal flow from the light source of a PON to ONUs of the PON. One signal port on the upstream side ("upstream port") is optically connected to a plurality of signal ports on the downstream side ("downstream ports"). For splitting an incoming optical signal, the optical signal is fed into the upstream port. The splitter splits the incoming signal into a plurality of outgoing optical signals of lower intensity, i.e. weaker optical signals. The outgoing signals exit the splitter simultaneously through the downstream ports. The outgoing signals may have essentially identical wavelength compositions.

The query signal splitter may also receive a plurality of incoming optical signals through its downstream ports and combine them into a single outgoing signal. The outgoing signal exits the splitter through the upstream port. The query signal splitter may thereby combine a plurality of incoming optical signals into one outgoing signal.

An upstream port of the query signal splitter may be optically connected to an end of an optical fibre, e.g. to an end of the test signal fibre. The opposite end of the test signal fibre may be optically connected to the test signal transceiver. Thereby the query signal splitter is optically connected to the test signal transceiver. A query signal, emitted by the test signal transceiver, may be fed through the test signal fibre into the query signal splitter. A response signal may be fed through the test signal fibre from the query signal splitter into the test signal transceiver.

A first downstream port of the query signal splitter may be optically connected to an end of a further optical fibre, e.g. to an end of a first "split test signal fibre". The opposite end of the first split test signal fibre may be optically connected to a first signal coupling device, e.g. a WDM, which is operable to couple a query signal into a fibre of the first PON. The first signal coupling device is thus optically connected to a fibre of the first PON. It is thereby optically connected to the first PON. The query signal splitter may thus be optically connected, e.g. by the test signal fibre, to the test signal transceiver and, by the first split test signal fibre, to the first PON such that the query signal splitter can feed a query signal, emitted by the test signal transceiver, into the first PON, and such that the query signal splitter can feed a response signal from the first PON into the test signal transceiver.

A second downstream low-intensity port of the query signal splitter may be optically connected to an end of yet a further optical fibre, e.g. to an end of a second split test signal fibre. The opposite end of the second split test signal fibre may be optically connected to a second signal coupling device, e.g. a WDM, which is operable to couple a query signal into a fibre of the second PON. The second signal coupling device is optically connected to a fibre of the second PON. It is thereby optically connected to the second PON. The query signal splitter may thus be optically connected, e.g. by the test signal fibre, to the test signal transceiver and, by the second split test signal fibre, to the second PON such that the query signal splitter can feed a query signal, emitted by the test signal transceiver, into the second PON, and such that the query signal splitter can feed a response signal from the second PON into the test signal transceiver.

The query signal splitter may thus be optically connected to the test signal transceiver and to the first and to the second PON. It may be optically connected to the test signal transceiver and to the first and to the second PON such that it can feed a query signal, emitted by the test signal transceiver, into the first PON and the second PON simultaneously, and such that it can feed response signals from the first PON and second PON into the test signal transceiver.

The query signal splitter may be a passive optical component. Since the query signal splitter may be a passive component, i.e. it does not require electrical power to operate, its installation in a fibre network may be easier than the installation of an optical switch, which generally requires electrical energy to operate. The query signal splitter can, e.g., be installed in places where no electrical power is available, for example in a splitter cabinet of a fibre network. Also, a splitter requires no control circuit and operates autonomously, while a switch must be actively operated. This is a further advantage of the fibre network according to the present disclosure.

The test signal fibre, the first split test signal fibre and/or the second split test signal fibre may be composed of a plurality of optical sub-fibres, in order to extend their lengths. The optical sub-fibres may, for example, be spliced together at their respective ends to form the test signal fibre, the first split test signal fibre and/or the second split test signal fibre.

A query signal may be transmitted by several fibres, splitters and signal coupling devices on its way from the test signal transceiver to a fibre-optic sensor and after reflection on its way back—as response signal—to the test signal transceiver. Each passage through a splitter reduces the intensity of a signal by a certain splitting ratio. When passing from a downstream port to the upstream port of a splitter, the signal is combined with a number of other unrelated signals, the number being possibly the inverse of the splitting ratio of the splitter. The signal is thus attenuated and noise is added to it before it arrives back at the test signal transceiver, where it is to be analyzed. The sensitivity of a test signal transceiver is limited. The more often a query signal is split, the higher the total splitting ratio, and/or the more the query signal is mixed or combined with unrelated signals ("noise"), the more difficult it is for the test signal transceiver to detect and analyze the associated response signal. A fibre network according to the present disclosure will be designed such that a response signal, originating from a query signal emitted by the test signal transceiver, after splitting, attenuation, reflection, mixing, and combining, is still clearly detectable by the test signal transceiver. Parameters like query signal intensity and query signal spectrum on emission, fibre quality, fibre length, splitting ratios, attenuation by a fibre-optic sensor, reflectivity of a reflector, and wavelength selectivity, may need to be adjusted, as is usual in the field, so that response signals are of an appropriate intensity and signal-to-noise ratio for the test signal transceiver to detect them clearly.

In a fibre network according to the present disclosure, the first PON or the second PON may be adapted such that the query signal and the first telecommunication signal travel in a same fibre of the first PON over at least a segment of the fibre, or such that the query signal and the second telecommunication signal travel in a same fibre of the second PON over at least a segment of the fibre. In this aspect, at least a part of one of the PONs is used to transmit both telecommunication signals and a query signal. At least a part of a PON may thus be used for two purposes, namely for telecommunication purposes and for interrogation of a sensor in the PON. For an existing telecommunication fibre network, this may make the presence of a separate fibre or of a separate network for sensor interrogation unnecessary.

In a specific aspect of the present disclosure, the query signal and the first telecommunication signals may travel in a same fibre of the first PON over at least a segment of the fibre simultaneously, and/or the query signal and the second telecommunication signals may travel in a same fibre of the second PON over at least a segment of the fibre simultaneously. In addition to the advantage of using a part of one of the PONs for two different purposes, the simultaneous transmission may avoid the need to interrupt the telecommunications function when interrogating a fibre-optic sensor in a PON, or to interrupt the sensor interrogation function when transmitting telecommunications signals. This may increase the availability time of the telecommunications function and/or of the sensor interrogation function.

In general, the query signal splitter of a fibre network according to the present disclosure may be a symmetric splitter. In other words, it may split an incoming signal into a plurality of outgoing signals of equal intensity. Symmetric splitters are simple to install, because all output ports provide the same signal strengths, and an optical fibre can be connected to any one of the output ports of the query signal splitter without having to consciously select a specific one of the output ports. Also, symmetric splitters are more cost-effective to procure. A splitting ratio of a symmetric query signal splitter may be defined as a ratio of intensity of an outgoing signal to intensity of the incoming signal. A splitting ratio of the query signal splitter may be 1:2, 1:4, 1:8, 1:16, 1:32, 1:64 or higher, e.g. 1:128. A higher splitting ratio results in the query signal being split into a smaller fraction, and a lower-intensity query signal being fed into each PON connected to the query signal splitter, while more PONs may be optically connectable to the query signal splitter. In certain embodiments of a fibre network according to the present disclosure, a total splitting ratio of 1:256 may provide for sufficient intensity of response signals when arriving at the test signal transceiver, so that they can be reliably detected and analyzed.

Alternatively, however, the query signal splitter may be adapted to feed a query signal, emitted by the test signal transceiver, into the first PON with higher power than it feeds the optical query signal into the second PON. In other words, the query signal splitter may be an asymmetric splitter, i.e. not all outgoing signals have equal power, intensity or strength. This may be advantageous in a fibre network, in which one of the PONs is much larger in size than another one of the PONs. The size of a PON may be defined, for example, by the number of subscribers, to which the PON transmits telecommunication signals. Feeding a stronger outgoing query signal into the larger PON may allow to receive a response signal out of the larger PON that is strong enough to be detected by the test signal transceiver. Feeding a weaker outgoing query signal into the smaller PON may still allow to receive a response signal out of the smaller PON that is strong enough to be detected by the test signal transceiver. For PONs having equal size, but different signal attenuation properties, feeding a stronger outgoing query signal into the PON with higher attenuation may allow to receive a response signal out of that PON that is strong enough to be detected by the test signal transceiver. An asymmetric query signal splitter may thus help to distribute query signal intensity in accordance with the size or attenuation properties of the PONs connected to the query signal splitter.

In a fibre network according to the present disclosure, the first or the second fibre-optic sensor may be optically connected to an element of the PON, which comprises the respective sensor, by a sensor fibre. The sensor fibre may be optically connected to the PON such that query signals can propagate through the PON and through the sensor fibre to the respective fibre-optic sensor, and such that response signals from that sensor can propagate through the sensor fibre, the PON and the query signal splitter to the test signal transceiver to which the PON is optically connected. The sensor fibre may be an optical fibre that is optically connected to an element of the respective PON such that the sensor fibre cannot transmit telecommunication signals to a subscriber. The sensor fibre may optically connect the fibre-optic sensor to a splitter of the PON comprising the sensor. The sensor fibre may optically connect the fibre-optic sensor to a signal coupling device, arranged in the PON comprising the sensor. Connecting a fibre-optic sensor to its PON via a sensor fibre may allow for placement of the sensor independent from the routing of network fibres of the PON transmitting telecommunication signals. It may also allow for using the sensor fibre for transmitting query signals and response signals only, not for transmitting telecommunication signals. A fibre-optic sensor that works by modifying attenuation properties of the sensor fibre may thus change attenuation of query signals and response signals without changing attenuation of any telecommunication signals. The telecommunication signals can therefore be detected more reliably.

Generally, a sensor fibre may be lengthwise composed of a plurality of optical sub-fibres, in order to extend its length. The optical sub-fibres may, for example, be spliced together at their respective ends to form the sensor fibre.

The sensor fibre may have two ends. One end, the "close" end, of the sensor fibre may be optically connected to an element of the PON, which comprises the respective fibre-optic sensor. The other, "far" end may be located adjacent to an element of the fibre-optic sensor, and/or it may be optically connected to an element of the fibre-optic sensor. The sensor fibre may comprise a reflector at the far end of the sensor fibre, e.g. close to the fibre-optic sensor. The reflector may be an end face of the far end of the sensor fibre. The reflector may be a polished or coated end face of the far end of the sensor fibre. Providing a reflector at the far end of the sensor fibre may increase the intensity of the response signal, thereby increasing its signal-to-noise ratio, and may make the response signal more reliable to detect. This, in turn, allows placement of a fibre-optic sensor, connected by the sensor fibre, at the end of a long fibre path, measured from the light source of the PON. It may also allow placement of the fibre-optic sensor behind a splitter having a high splitting ratio. It may also allow placement of the sensor behind the splitter in a one-stage PON, or behind the second splitter in a two-stage PON. Providing a reflector at the far end of the sensor fibre may also allow for use of a fibre-optic sensor that attenuates the query signal strongly, because the response signal may still have sufficient intensity to be reliably detected. The query signal may have a specific wavelength spectrum, and the reflector may be adapted to selectively reflect light having wavelengths within the wavelength spectrum of the query signal, and transmit light having wavelengths outside the wavelength spectrum of the query signal. This allows inserting a reflector into a telecommunication signal path to selectively reflect a query signal and let the telecommunication signals pass unimpeded. The reflector may be adapted to selectively reflect one or two wavelengths of light travelling in the sensor fibre. The reflector, in this case, acts as a filter that reflects selected wavelengths only. A query signal having a broader wavelength spectrum, may thereby be filtered to contain one or two wavelengths only.

In one specific aspect of the disclosure, the geometrical distance between the reflector and the fibre-optic sensor, which is connected by the sensor fibre to other elements of a respective PON, as measured along the length of the sensor fibre, is less than 300 meters. The total length of fibre between the test signal transceiver and the reflector at the far end of the sensor fibre affects the time delay between emission of a query signal and the arrival of the associated response signal at the test signal transceiver. In some fibre networks according to the present disclosure, a position of a fibre-optic sensor in the network is determined by the time delay between emission of a query signal and the arrival of the associated response signal from the sensor fibre. If two fibre-optic sensors, in one PON or in different PONs, have a same length of fibre between the test signal transceiver and the reflector at the far end of their respective sensor fibres, measured along the lengths of the respective sensor fibres, the time delay between their respective query and response signals will be equal, and an ambiguity may arise as to which sensor generated a response signal. Adding extra fibre length in one of the sensor fibres may remove this ambiguity. The extra length of fibre may be arranged between the fibre-optic sensor and the reflector at the far end of the sensor fibre.

Alternatively, a fibre-optic sensor may not be optically connected to a PON by a sensor fibre. The sensor may be optically arranged at the root fibre of the PON or at a network fibre of the PON.

In some fibre networks according to the present disclosure, the query signal may have a specific wavelength spectrum. It may have a specific wavelength, e.g. 1625 nm or 1650 nm.

Generally, a fibre network according to the present disclosure may further comprise a signal coupling device, adapted such and optically arranged in the first or in the second PON such that the signal coupling device can feed a query signal into a sensor fibre towards the respective first or second fibre-optic sensor. The fibre coupling device can thus extract the query signal from an element of the PON, and feed it into the sensor fibre towards the respective sensor. A signal coupling device generally has a "separated" side and a "combined" side. The separated side has a plurality of separated ports and the combined side has a combined port. The signal coupling device is operable to couple a first optical signal, entering on a first one of its separated ports, and a second optical signal, entering on a second one of its separated ports, into a single combined third optical signal, outgoing on the combined port. The signal coupling device is also operable to separate a fourth optical signal, entering on the combined port, into a fifth optical signal and a sixth optical signal, outgoing on two separate ones of its separated ports. In one aspect, the signal coupling device may separate and combine the power or intensity of optical signals. In this aspect, its function may resemble the function of a power splitter.

Alternatively, the signal coupling device may be a wavelength-dependent signal coupling device, i.e. it may separate and combine wavelength components of optical signals. In this case, its function may resemble the function of a wavelength division multiplexer ("WDM"). The signal coupling device may be a wavelength division multiplexer. A wavelength-dependent signal coupling device may isolate certain wavelength components of the fourth incoming optical signal from other wavelength components of the incoming signal. The output of this type of signal coupling device may then be two signals: the fifth signal comprising certain wavelengths components of the incoming fourth signal, and the sixth signal comprising other, e.g. the remaining, wavelength components of the incoming fourth signal. The wavelength dependent signal coupling device may also be usable for combining certain wavelength components of the first incoming optical signal with wavelength components of a the second incoming optical signal, the output being the third optical signal that comprises the wavelength components of both the first signal and the second signal.

A fibre network comprising a signal coupling device may allow particularly efficient coupling of a query signal from the test signal transceiver into the PON, in which the signal coupling device is arranged. It may also allow for efficient extraction of the query signal from an element of the PONA signal coupling device thereby facilitates using the elements of a PON for transmission of telecommunication signals and, simultaneously or sequentially, of query signals and response signals for interrogating a fibre-optic sensor in the PON. A wavelength-dependent signal coupling device may allow to operate the test signal transceiver and the sensors at specific test wavelengths. In certain embodiments, the query signal and the associated response signal have a specific wavelength. That wavelength may be called a test wavelength. Such test wavelengths may be different from the wavelengths of the light used for the telecommunication signals. The interrogation of sensors in a PON may thereby be performed in a separate wavelength domain from the wavelength domain for the transmission of telecommunication signals. This makes interference between the two types of signals less likely, and the entire fibre network may be more reliable.

Generally, a fibre-optic sensor in the fibre network according to the present disclosure, comprising a sensor fibre as described above, may further comprise an actuator, which may be adapted to deform at least a segment of the sensor fibre. The deformation of the sensor fibre may be such, that it causes a change in the optical attenuation of a query signal and/or of a response signal propagating in the sensor fibre. The sensor fibre may, for example, comprise a portion which can be bent by the actuator to a radius which is smaller than a specific minimum bend radius. A query signal or a response signal, transmitted in the sensor fibre and propagating through the bent portion, may be attenuated. Generally, attenuation of an optical signal is a reduction of intensity of the signal. The actuator may be mechanically coupled to a door of a fibre-optic cabinet, such that when the door is opened, the actuator deforms the sensor fibre and thereby causes a change in the optical attenuation of a query signal and/or of a response signal propagating in the sensor fibre, which change is detectable by the test signal transceiver. The actuator may thus provide the translation of an external effect into a change of an attenuation property of the sensor fibre. That change may be detected and measured by the test signal transceiver.

Deformation of the sensor fibre may cause a change in the optical attenuation property of the sensor fibre for one or more specific wavelengths or for one or more specific wavelength intervals only. As mentioned before, a query signal may have a specific wavelength, or it may have a specific wavelength spectrum, in which one or more wavelengths have a considerably higher intensity than the remaining wavelengths. In a fibre network according to the present disclosure, the first or the second fibre-optic sensor the actuator may be adapted to deform at least a segment of the sensor fibre such, that the deformation of the sensor fibre causes a change in the optical attenuation of the query signal in the sensor fibre for at least one wavelength within the wavelength spectrum of the query signal. This may allow to attenuate one or more of the wavelength components within the spectrum of the query signal, while other wavelength components may remain unattenuated. This may allow to provide two different fibre-optic sensors, acting on the same sensor fibre. One of the sensors may attenuate a first wavelength within the spectrum of the query signal, while the other sensor may attenuate a second wavelength within the spectrum of the query signal. A suitable test signal transceiver may discern between attenuation introduced by the two sensors.

The first and/or the second fibre-optic sensor may be a passive sensor. Passive sensors do not require a supply of electrical energy to operate. Passive fibre-optic sensors can thus be used in locations where electrical energy is not available or where the presence of electricity may create hazards or interference with other devices or with the environment. A passive sensor may make it unnecessary to provide electrical energy in the location of a fibre network in which it is installed, e.g. in a splice cabinet or a splitter cabinet of a PON. Alternatively, however, the first and/or the second fibre optic sensor may be an active sensor. In other words, the sensor requires electrical energy to operate.

Generally, in a fibre network according to the present disclosure, the test signal transceiver, the first PON, the second PON, the first fibre-optic sensor, the second fibre-optic sensor, and/or the query signal splitter may be adapted such that the first fibre-optic sensor or the second fibre-optic sensor can be repeatedly interrogated by the test signal transceiver at time intervals of 10 seconds or less between two subsequent interrogations of the same sensor. For that purpose, certain measures can be taken. For example, the test signal transceiver may be adapted to emit query signals of sufficient intensity so that the corresponding response signals have a sufficient intensity and signal-to-noise ratio when arriving back at the test signal transceiver for quick and reliable detection. The PONs may split a query signal only so often, that the corresponding response signals out of that PON have a sufficient intensity and signal-to-noise ratio when arriving back at the test signal transceiver for quick and reliable detection. The fibre-optic sensors may introduce any degree of attenuation. The attenuation may be adapted to enable a comparison of an attenuated response signal from that sensor with an unattenuated response signal from that sensor at the test signal transceiver. The attenuation may be adapted such that an attenuated response signal from one sensor has a significantly lower intensity than an unattenuated response signal from the same sensor at the test signal receiver. A fibre-optic sensor may attenuate the query signal and/or the response signal so strongly that no detectable response signal arrives back at the test signal transceiver. A fibre-optic sensor may alternatively attenuate a query signal and/or a response signal to a degree that response signals out of that sensor have a sufficient intensity and signal-to-noise ratio when arriving back at the test signal transceiver for quick and reliable detection. The query signal splitter may have a low-enough splitting ratio, so that response signals out of one of the PONs connected to the query signal splitter have a sufficient intensity and signal-to-noise ratio when arriving back at the test signal transceiver for quick and reliable detection. In certain embodiments, the test signal transceiver may be adapted to compare an attenuated response signal from a fibre-optic sensor with an unattenuated response signal from the same sensor. An attenuated response signal may have been received by the test signal transceiver earlier than the unattenuated response signal or vice versa. A time interval of 10 seconds or less between interrogations of a specific sensor allows for a quick and reliable detection of an abnormal situation, as detected and indicated by one of the sensors. This, in turn, may facilitate a quick reaction to the situation and thus help to protect and/or secure elements of the fibre network.

Generally, a fibre network according to the present disclosure may comprise one or more further PONs. Each further PON may comprise a respective light source for generating respective telecommunication signals and may comprise a respective fibre-optic sensor. Each further PON may be adapted to transmit the respective telecommunication signals to a plurality of subscribers. Each further PON may be optically connected to the test signal transceiver such that query signals from the test signal transceiver can be fed into the further PON and propagate in the further PON to the respective fibre-optic sensor, and such that the test signal transceiver can receive response signals from the respective fibre-optic sensor. The query signal splitter may be adapted for feeding a query signal, emitted by the test signal transceiver, into the first PON, the second PON and the further PON(s) simultaneously, and for feeding response signals from the first PON, the second PON and the further PON(s) into the test signal transceiver. The query signal splitter may be optically connected to the test signal transceiver and to the first PON, the second PON and the further PON(s) such that the query signal splitter can feed a query signal, emitted by the test signal transceiver, into the first PON, the second PON and the further PON(s) simultaneously, and such that the query signal splitter can feed response signals from the first PON, the second PON and the further PON(s) into the test signal transceiver. Interrogating sensors in the first PON, the second PON and in further PONs simultaneously may make the time between two subsequent interrogations of any one sensor in any one of the PONs shorter. Interrogating further PONs using the same test signal transceiver and the same query signal splitter may make the presence of additional test signal transceivers and/or query signal splitters obsolete and may thus make the fibre network more cost-effective.

BRIEF DESCRIPTION OF THE FIGURES

The invention will now be described in more detail with reference to the following Figures exemplifying particular embodiments of the invention.

DETAILED DESCRIPTION

Figure 1:
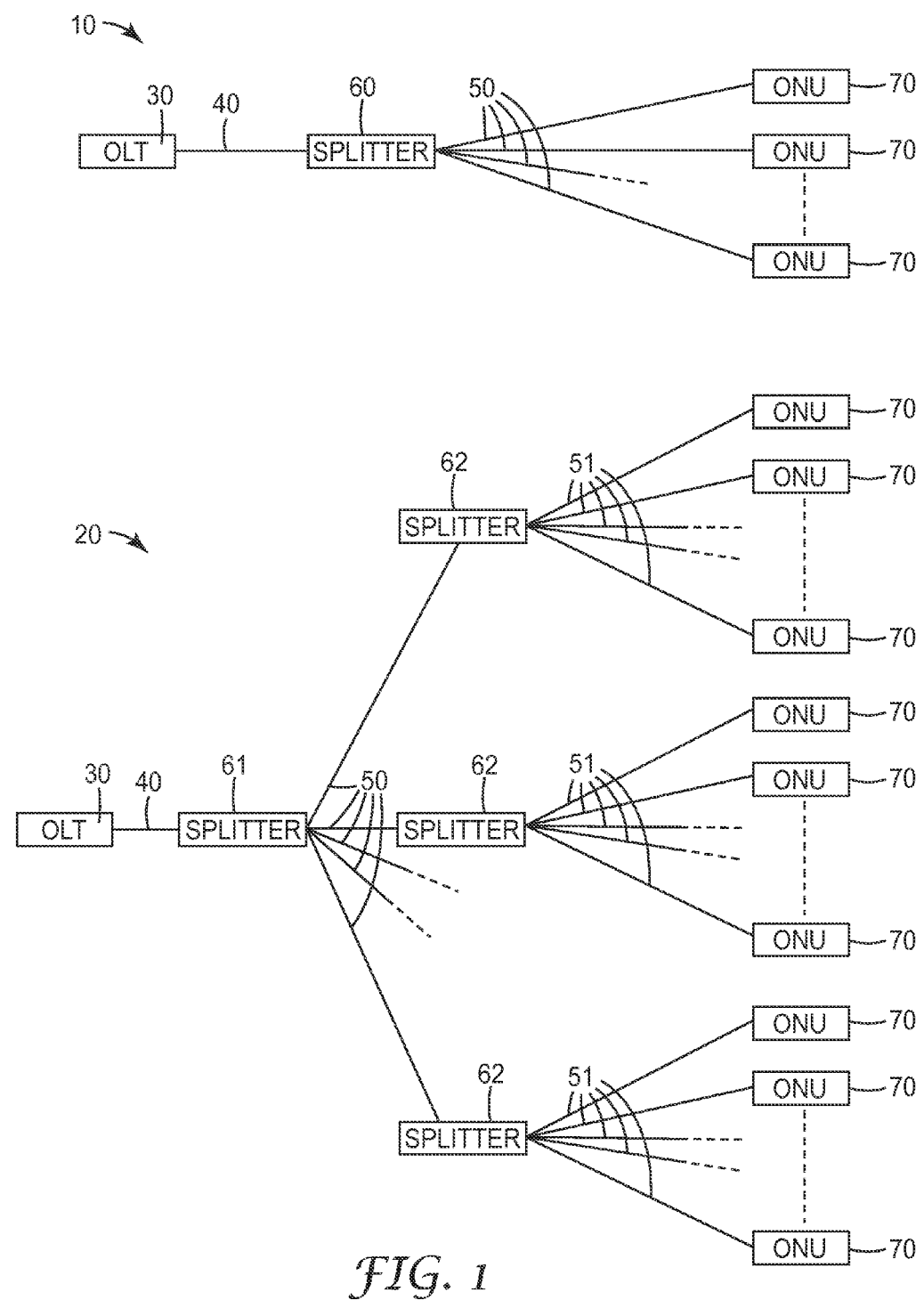
FIG. 1 Schematic network diagram of a fibre network comprising PONs.

Herein below various embodiments of the present invention are described and shown in the drawings wherein like elements are provided with the same reference numbers. When reference is made to an optical fibre, that fibre may be composed of several optical fibres, connected with each other at their ends, that form one fibre path. The root fibre 40 in FIGS. 1 and 2 may, for example, be formed by three physical fibres that are spliced together at their ends.

FIG. 1 is a schematic network diagram of a fibre network comprising two passive optical networks (PONs) 10, 20. The first PON 10, i.e. the upper PON in FIG. 1, is a one-stage PON 10. The first PON 10 comprises a light source 30, optical fibres 40, 50, a splitter 60, and a plurality of Optical Network Units (ONUs) 70. The OLT 30 is located in the central office of the network operator, whereas the ONUs 70 are located at subscribers' premises.

The light source is an Optical Light Terminal ("OLT") 30. The OLT 30 can generate optical telecommunication signals and can transmit these signals into a root fibre 40 of the first PON 10. The root fibre 40 is the optical fibre connection between the OLT 30 and the splitter 60 which a signal transmitted by the OLT 30 first encounters. The OLT 30 can also receive optical telecommunication signals from the root fibre 40. The splitter 60 is a 1:32 splitter, i.e. it splits the telecommunications signals arriving through the root fibre 40 into thirty-two identical, yet weaker, outgoing telecommunication signals. These outgoing signals are transmitted further by thirty-two network fibres 50 to thirty-two ONUs 70. Optical telecommunication signals can thus be transmitted from the OLT 30 through the fibres 40, 50 and the splitter 60 to the ONUs 70. For communication towards the central office, an ONU 70 can also generate optical telecommunication signals. A telecommunication signal from an ONU 70 can be transmitted through a network fibre 50 to the splitter 60. The splitter 60 optically combines, i.e. superposes, optical telecommunication signals incoming from the thirty-two network fibres. The splitter 60 transmits the combined signal further into the root fibre 40 and, via the root fibre 40, into the OLT 30. Optical telecommunication signals can thus be transmitted from an ONU 70 through the fibres 40, 50 and the splitter 60 to the OLT 30. The first PON 10 is a one-stage PON, because a signal from the OLT 30 is split by one single splitter 60 only before it arrives at the ONUs 70.

The second PON 20 is a two-stage PON 20. Like the first PON 10, it comprises a light source 30, optical fibres 40, 50, 51, splitters 61, 62, and a plurality of Optical Network Units (ONUs) 70. Optical telecommunication signals can be transmitted from the OLT 30 through the fibres 40, 50, 51 and the splitters 61, 62 to the ONUs 70, as described above for the first PON 10. In the two-stage PON 20, however, an optical telecommunication signal from the OLT 30 is split twice, by a first splitter 61 and a second splitter 62, before it arrives at an ONU 70. The first splitter 61 is a 1:8 splitter, i.e. it splits the telecommunications signals arriving through the root fibre 40 into eight identical, yet weaker, outgoing telecommunication signals. The second splitters 62 are 1:5 splitters. An optical telecommunication signal from the OLT 30 is thus split once in 1:8 in the splitter 61 of a first stage, and the split signal is split again in 1:5 in one of the splitters 62 of the second stage. Disregarding attenuation in the fibres 40, 50, coupling losses and splitter losses, about 1/40 of the power of the signal emitted by the OLT 30 arrives at the respective ONUs 70. All forty ONUs 70 receive the same split telecommunication signal from the OLT 30. In other words, telecommunication signals are cascaded from the OLT 30 to the ONUs 70. Telecommunication signals from the OLT 30 are transmitted, through fibres 40, 50, 51 and splitters 61, 62 simultaneously.

Also in the two-stage PON 20, a telecommunication signal can be transmitted in the opposite direction, i.e. from an ONU 70 to the OLT 30: the signal from the ONU 70 is transmitted through a network fibre 51 of the second stage, to which the ONU 70 is connected, to one of the second-stage splitters 62 and further, through a corresponding network fibre 50 of the first stage, to the first-stage splitter 61 and further via the root fibre 40 to the OLT 30. The second-stage splitter 62 optically combines, i.e. superposes, optical telecommunication signals incoming from five ONUs 70 via corresponding five network fibres 51. The combined signal is transmitted from the second-stage splitter 62 to the first-stage splitter 61. The first-stage splitter 61 optically combines, i.e. superposes, the combined optical telecommunication signals incoming from the eight second-stage splitters 62 via five network fibres 50. The first-stage splitter 61 transmits the combined signal further into the root fibre 40 and, via the root fibre 40, into the OLT 30.

Figure 2:
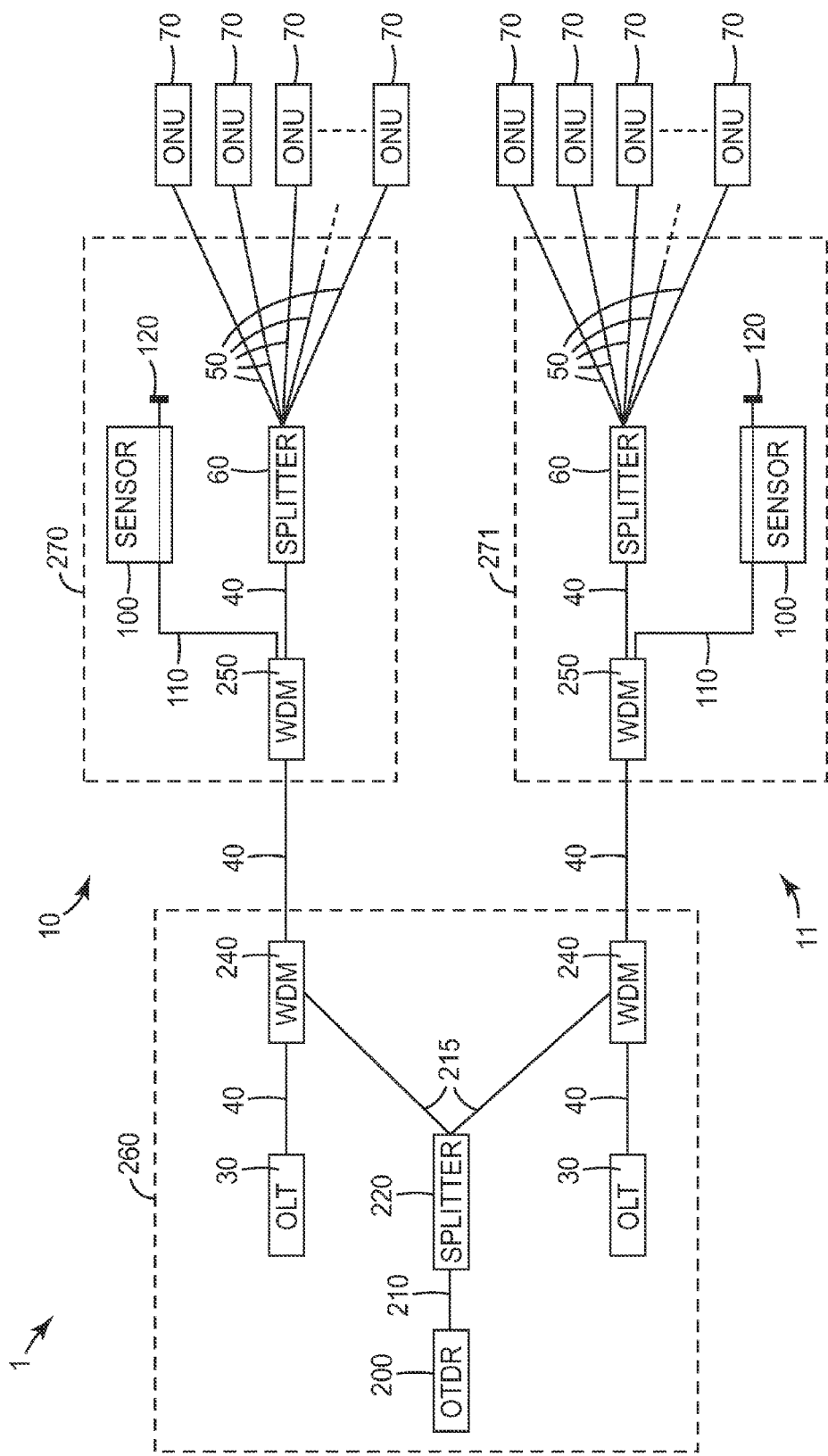
FIG. 2 Schematic network diagram of a fibre network according to the invention.

A fibre network 1 according to one aspect of the invention is shown in the schematic network diagram of FIG. 2. The fibre network 1 comprises two one-stage PONs 10, 11. Both PONs 10, 11 have an identical structure or architecture: each PON 10, 11 has an OLT 30, a root fibre 40, a splitter 60, network fibres 50 and ONUs 70. The function of the OLT 30, the root fibre 40, the splitters 60, the network fibres 50 and the ONUs 70 is the same as described in the context of FIG. 1. These elements are used to transmit, within the respective PON 10, 11, telecommunication signals from the OLT 30 of the PON 10, 11 to the ONUs 70 of the respective PON 10, 11, which are optically connected to the OLT 30. The telecommunication signals have wavelengths of 1310 nm, 1490 nm, and/or 1550 nm and are transmitted in the same root fibre 40 and the same network fibres 50.

The first PON 10 comprises a fibre-optic sensor 100, which will be described in detail below in the context of FIGS. 5a and 5b. The sensor 100 is optically connected to other elements of the first PON 10 by a sensor fibre 110. One end, the "close" end, of the sensor fibre 110 is optically connected to other elements of the PON 10, specifically to a Wavelength Division Multiplexer 250. The opposite end, the "far end", of the sensor fibre 110 comprises a reflector 120. The fibre network 1 further comprises a test signal transceiver, which in this embodiment is an Optical Time Domain Reflectometer ("OTDR") 200, which serves to interrogate the fibre-optic sensors 100 in the first PON 10 and in the second PON 11. For that purpose, the OTDR 200 generates and emits optical query signals of a specific wavelength of 1625 nm. This wavelength is generally used for testing and monitoring purposes in fibre-optic networks. The OTDR 200 emits the query signals into a test signal fibre 210, which transmits the signal to a query signal splitter 220. The query signal splitter 220 splits the query signals from the OTDR 200 into two identical, yet weaker query signals. These split query signals have the same wavelength spectrum as the original, unsplit query signals. The query signals are not used to transmit telecommunication data, but their purpose is interrogation of the fibre-optic sensors 100 in the PONs 10, 11, to which the OTDR 200 is optically connected.

The query signals of the OTDR 200 are transmitted further towards the first PON 10 by a split test signal fibre 215 and are coupled into the root fibre 40 of the first PON 10 by a signal coupling device, which in this embodiment is a Wavelength Division Multiplexer ("WDM") 240. The WDM 240 combines the light having the wavelength spectrum of the query signal, i.e. light having a wavelength of 1625 nm, with the light having the wavelength spectrum of the telecommunication signals of the OLT 30, which light has wavelengths of 1310 nm, 1490 nm and 1550 nm. The WDM 240 outputs a combined signal which has a telecommunication signal component of a certain wavelength spectrum and a query signal component of a different wavelength spectrum. The WDM 240 is thus a wavelength-dependent signal coupling device. The combined signal is transmitted through the root fibre 40 towards the ONUs 70 of the first PON 10. Before reaching the splitter 60, the wavelength component of the query signal is separated from the wavelength components of the telecommunication signals by a second WDM 250. The second WDM 250 isolates light having the wavelength of the query signal, i.e. 1625 nm, from light having other wavelengths, in particular from light of the telecommunications signals. The second WDM 250 feeds light having the wavelength spectrum of the query signal into the sensor fibre 110, which is optically connected to the second WDM 250, while the remaining wavelength components of the combined signal, i.e. the wavelength components of the telecommunication signals, are transmitted further by the root fibre 40 to the splitter 60. The splitter 60 is a 1:32 power splitter which splits the telecommunication signals and transmits the split signals through network fibres 50 to thirty-two ONUs 70 at subscriber locations.

In an alternative embodiment, not shown in FIG. 2, the query signal, propagating in the sensor fibre 110, is split in a further splitter. By that further splitter, a fraction of the power of the query signal is transmitted to the fibre-optic sensor 100 for interrogation of that sensor 100, while the remaining power of the query signal is transmitted to the splitter 60, which re-combines that fraction of the query signal with the telecommunication signals in the root fibre 40 and feeds the combined signal into network fibres 50 towards the ONUs 70.

Figure 5A:
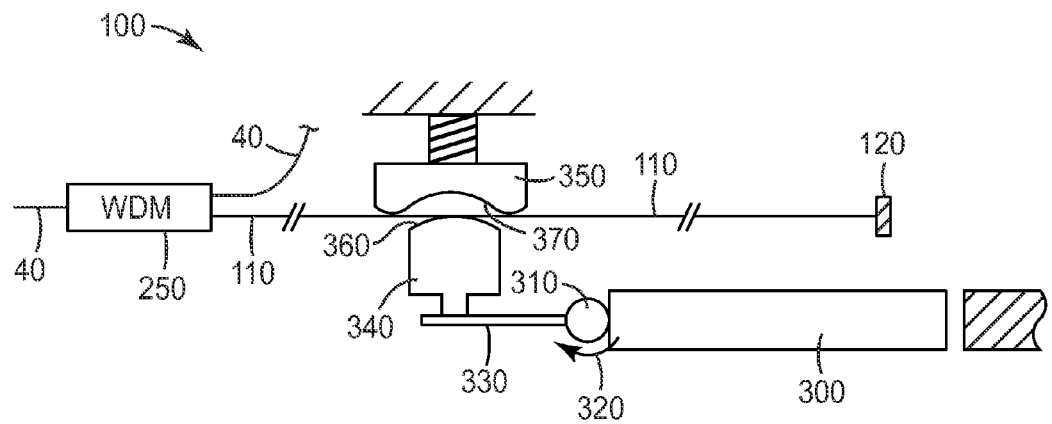
FIG. 5a Schematic top view of a fibre-optic sensor on a door, door closed.
Figure 5B:
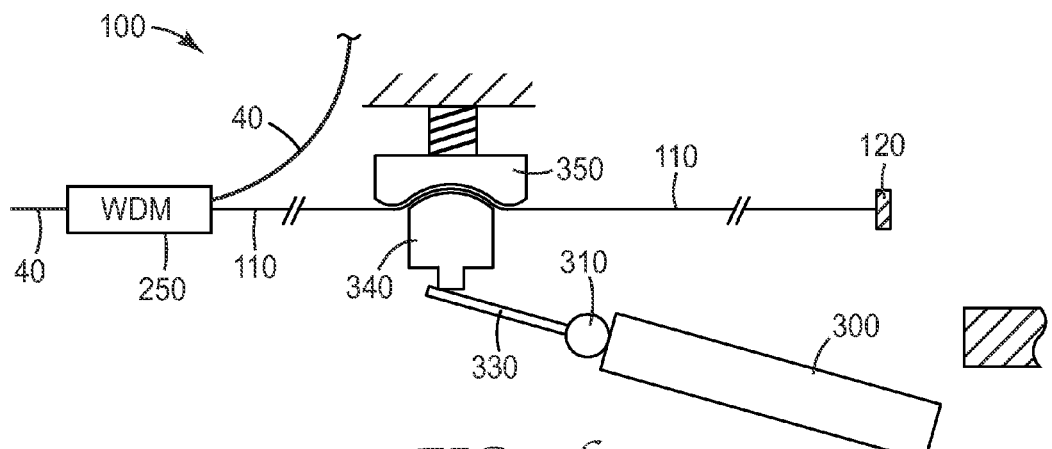
FIG. 5b Schematic top view of the fibre-optic sensor of FIG. 5a, door opened.

The fibre-optic sensor 100 of the first PON 10 may be a door sensor, for example one as shown in FIGS. 5a and 5b. The sensor 100 attenuates the query signal, depending on the environmental conditions sensed by the sensor 100. The degree of attenuation is an indication of environmental conditions. The attenuated query signal is transmitted further by the sensor fibre 110 to the reflector 120, located at the far end of the sensor fibre 110. The reflector 120 reflects the attenuated query signal back into the sensor fibre towards the OTDR 200. The query signal can be attenuated again in the sensor fibre 110 when passing by the sensor 100 for the second time, depending on the environmental conditions sensed by the sensor 100. The resulting signal, i.e. the query signal which may have been attenuated twice and reflected once, is the response signal. The response signal is transmitted through the sensor fibre 110 back to the second WDM 250. The second WDM 250 combines the wavelength components of the response signal with the spectrum of the telecommunication signals. The combined signal is transmitted from the second WDM 250 through the root fibre 40 to the first WDM 240. The first WDM 240 separates the wavelength components of the response signal from the wavelength components of the telecommunication signals. It feeds the response signal wavelength component into the split test signal fibre 215, which is optically connected to the second WDM 240, while the remaining wavelength components of the combined signal, i.e. the wavelength components of the telecommunication signals, are transmitted further by the root fibre 40 to the OLT 30. The split test signal fibre 215 transmits the response signal to the query signal splitter 220. The query signal splitter 220 combines the response signals out of the first PON 10 with the response signals out of the second PON 11. The combined response signal is transmitted via the test signal fibre 210 to the OTDR 200.

The OTDR 200 analyzes the combined response signal. A possible OTDR analysis method is to compare a recently obtained response signal with a previously recorded "normal" response signal, which was recorded when all sensors 100 were in a "normal" state, i.e. when the environmental conditions at all sensors 100 were as they should normally be: for example all doors closed, and no humidity or liquid present at the location of the sensors. A deviation between a recent response signal and the "normal" response signal indicates that at least one of the sensors 100 might be in a non-"normal" or activated state. The OTDR 200 can determine in known ways which sensor 100 is in an activated state.

The query signal splitter 220 is a power splitter, which generally splits the power of optical signals, independent of their wavelengths, as opposed to a WDM, which generally splits and combines wavelength components of optical signals, independent of their power.

The second PON 11 in FIG. 2 is identical to the first PON 10, and is therefore not described separately. A response signal from the second PON 11 is fed through a separate split test signal fibre 215 into the same query signal splitter 220 as the response signal from the first PON 10. The query signal splitter 220 combines the response signals out of the second PON 11 with the response signals out of the first PON 10. The combined response signal is transmitted via the test signal fibre 210 to the OTDR 200.

The query signal splitter 220 feeds the query signal emitted by the OTDR 200 into the first PON 10 and into the second PON 11 simultaneously. Response signals from the PONs 10, 11 may, however, arrive at the query signal splitter 220 at different times. The query signal splitter 220 passes the response signals on towards the OTDR 200 as they arrive. The delay between emission of the query signal from the OTDR 200 and the arrival of response signals from the PONs 10, 11 at the OTDR 200 can be used to determine the location of a sensor 100. A PON 10, 11 may comprise more than one sensor 100 and associated reflector 120. Response signals from two sensors 100 in the same PON 10, 11 or in different PONs 10, 11 may arrive at the OTDR 200 at different times, depending on the total length of optical fibre between the OTDR 200 and the respective reflectors 120 associated with the sensors 100. The time interval between arrival of the two response signals can be used to identify a specific sensor 100, e.g. when setting up the fibre network 1. If, however, two sensors 100 happen to have the same length of optical fibre between the OTDR 200 and the respective reflectors 120 associated with the sensors 100, the two sensors 100 can not be discerned by the time delay between emission of the query signal and the arrival of the response signals. This results in an ambiguity. In order to remove the ambiguity, additional fibre length may be introduced into the sensor fibre of one of the two ambiguous sensors 100, so that the reflector 120 of one of the sensors 100 is now optically further away from the OTDR 200 than the reflector 120 of the other sensor 100. Their respective time delays are now different, and the sensors 100 can be discerned by the OTDR 200.

In the fibre network 1 of FIG. 2, the OLTs 30, the first WDMs 240, the OTDR 200 and the query signal splitter 220 are located in a central office 260 of the network operator. The second WDM 250, the splitter 60 and the sensor 100 of the first PON 10 are located in a splitter cabinet 270, typically a few kilometres away from the central office 260, and typically a few hundred meters away from the ONUs 70 of the subscribers to which the first PON 10 transmits telecommunication signals. Similarly, The second WDM 250, the splitter 60 and the sensor 100 of the second PON 11 are located in a different splitter cabinet 271, again typically a few kilometres away from the central office 260, and typically a few hundred meters away from ONUs 70 of those subscribers to which the second PON 11 transmits telecommunication signals. The sensors 100 in the respective splitter cabinets 270, 271 are sensors 100 that detect the opening of a door of the splitter cabinet 270. They will be described in detail in the context of FIGS. 5a and 5b.

The fibre network 1 shown in FIG. 2 can be extended to comprise a third PON, a fourth PON or even more further PONs (not shown). In each of the further PONs, a split test signal fibre 215 connects the further PON to the same query signal splitter 220 and, via the test signal fibre 210, to the OTDR 200. The query signal splitter 220 is then connected to each of the PONs and is adapted to split the query signal from the OTDR 200 into a corresponding number of query signals, which are fed into all connected PONs simultaneously. The splitting ratio of the query signal splitter 220 might then be 1:32 in order to connect 32 PONs to the OTDR 200, or 1:64 in order to connect 64 PONs. The splitting of the query signal splitter 220 may be uneven, so that more optical power is fed into one or some of the PONs, while less optical power is fed into a different PON. Such uneven or asymmetric splitting is particularly useful if one OTDR 200 interrogates a large PON (e.g. a PON transmitting telecommunication signals to sixty-four subscribers) and a small PON (e.g. a PON transmitting telecommunication signals to eight subscribers) simultaneously. A limit for splitting a query signal in a fibre network 1 according to the disclosure is given by the requirement that the response signal received by the OTDR 200 must be discernible from noise in the OTDR 200. The total splitting ratio of the query signal, i.e. the ratio of the lowest query signal power arriving at any one of the fibre ends of any PON connected to the OTDR 200 and the query signal power as emitted by the OTDR 200, may be 1:16, 1:32, 1:64, or 1:128 or even higher. The properties of the OTDR 200, of the fibres 40, 50, 210, 215, of the splitters 220, 50, 60, of the WDMs 240, 250 and of the reflectors 120, among others, determine which total splitting ratio of the query signal still yields a response signal at the OTDR 200 that can be reliably detected and analyzed.

Figure 3:
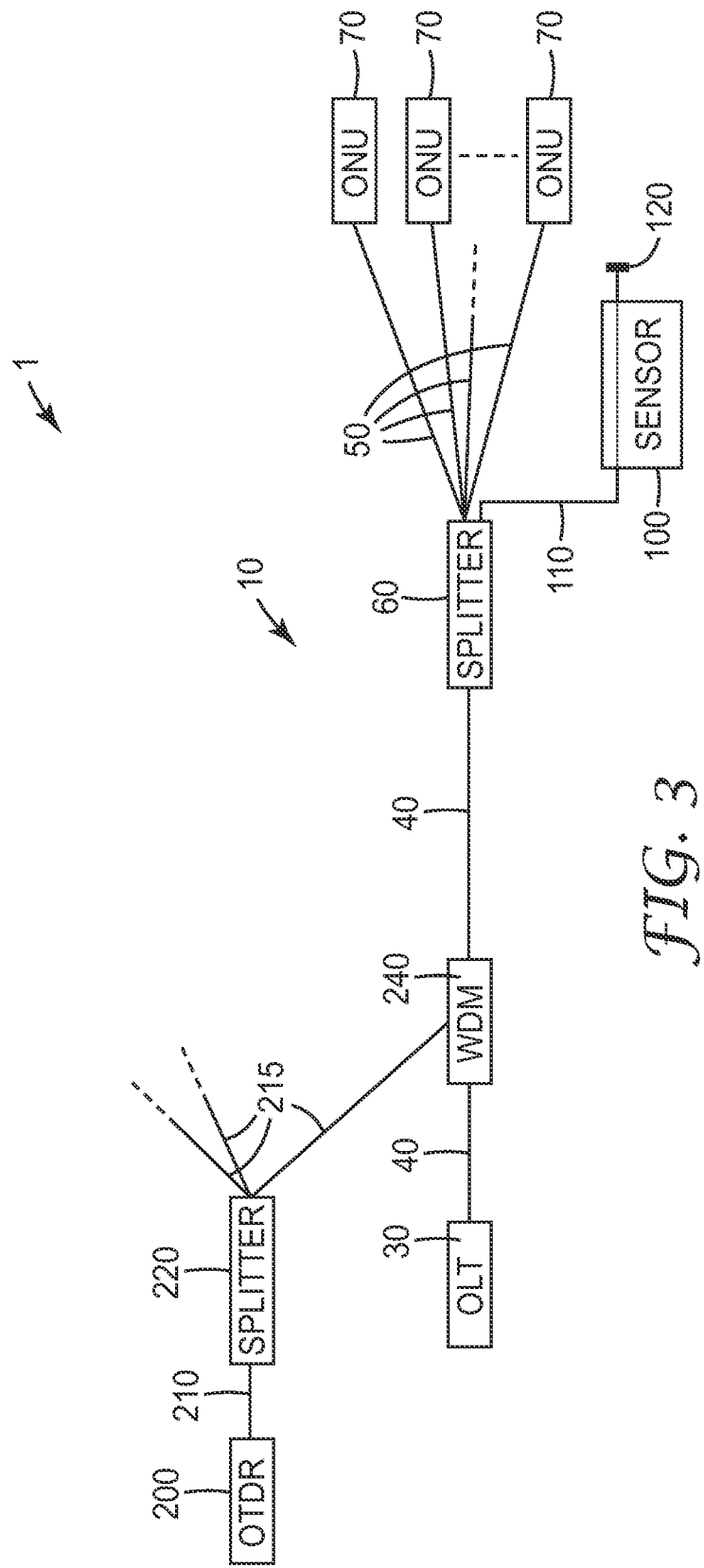
FIG. 3 Schematic network diagram of a further fibre network according to the invention.

In an alternative embodiment of the invention, a fibre-optic sensor 100 can be arranged "behind" the splitter 60, the output fibres of which are connected to the ONUs 70 of the subscribers. This embodiment is shown in FIG. 3. Like in the fibre network of FIG. 2, query signals from the OTDR 200 are simultaneously fed by the query signal splitter 220 and by split test signal fibres 215 into a plurality of PONs. The query signal splitter 220 has a splitting ratio of 1:8. In the embodiment shown in FIG. 3, eight PONs are optically connected to the query signal splitter 220. Only one of these PONs 10 is shown in FIG. 3. The OTDR 200 emits query signals of a wavelength of 1625 nm. These are coupled into the root fibre 40 of the PON 10 and combined by a WDM 240 with the telecommunication signals emitted by the OLT 30. The root fibre 40 transmits the combined signal to the splitter 60. A difference to the fibre network of FIG. 2 is that in the fibre network 1 of FIG. 3, the fibre-optic sensor 100 is optically arranged behind the splitter 60, as seen from the OTDR 200. The splitter 60 is a power splitter. It splits the signal, incoming from the root fibre 40, into thirty-two identical signals and feeds these signals into thirty-one network fibres 50 towards thirty-one ONUs 70, and into one sensor fibre 110 towards a fibre-optic sensor 100. The sensor 100 is identical to the sensor 100 in FIG. 2. It comprises the reflector 120, which selectively reflects the wavelength of the query signal, i.e. 1625 nm, back into the sensor fibre 110 towards the splitter 60. The response signal, having a wavelength component of 1625 nm, passes through the sensor 100 again. Depending on the state of the sensor 100, it is attenuated or not. The response signal is then transmitted to the splitter 60 which combines it with telecommunication signals arriving from the thirty-one network fibres 50. The combined signal is transmitted from the splitter 60 through the root fibre 40 to the WDM 240. The WDM 240 extracts the wavelength components of the response signal, i.e. the wavelength of 1625 nm, out of the combined signal, and passes the response signal, through the split test signal fibre 215, to the query signal splitter 220. In the query signal splitter 220, the response signal out of the PON 10 shown in FIG. 3 is combined with response signals from the other seven PONs, which are not shown. The combined signal is then transmitted, through the test signal fibre 210, to the OTDR 200, where it is received and analyzed.

In this embodiment, the query signal from the OTDR 200 is thus split twice before arriving at the sensor 100, namely by the query signal splitter 220 and by the splitter 60. For a given splitting ratio of the query signal splitter, the query signal arriving at the sensor 100 is therefore weaker than it would be if a WDM would extract the query signal from the combined signal in the root fibre 40 in front of the splitter 60, as is the case in FIG. 2. For the response signal, arriving back at the OTDR 200 after reflection at the reflector 120 of the sensor 100, to be of sufficient intensity for reliable detection and analysis in the OTDR 200, the query signal splitter 220 can have a lower splitting ratio than it could have if a WDM would extract the query signal from the combined signal in the root fibre 40 in front of the splitter 60. While in the embodiment shown in FIG. 3 fewer ONUs 70 can be optically connected to the OTDR 200, the fibre network 1 it performs simultaneous interrogation of fibre-optic sensors 100 in different PONs 10 without requiring a second WDM 250.

Figure 4:
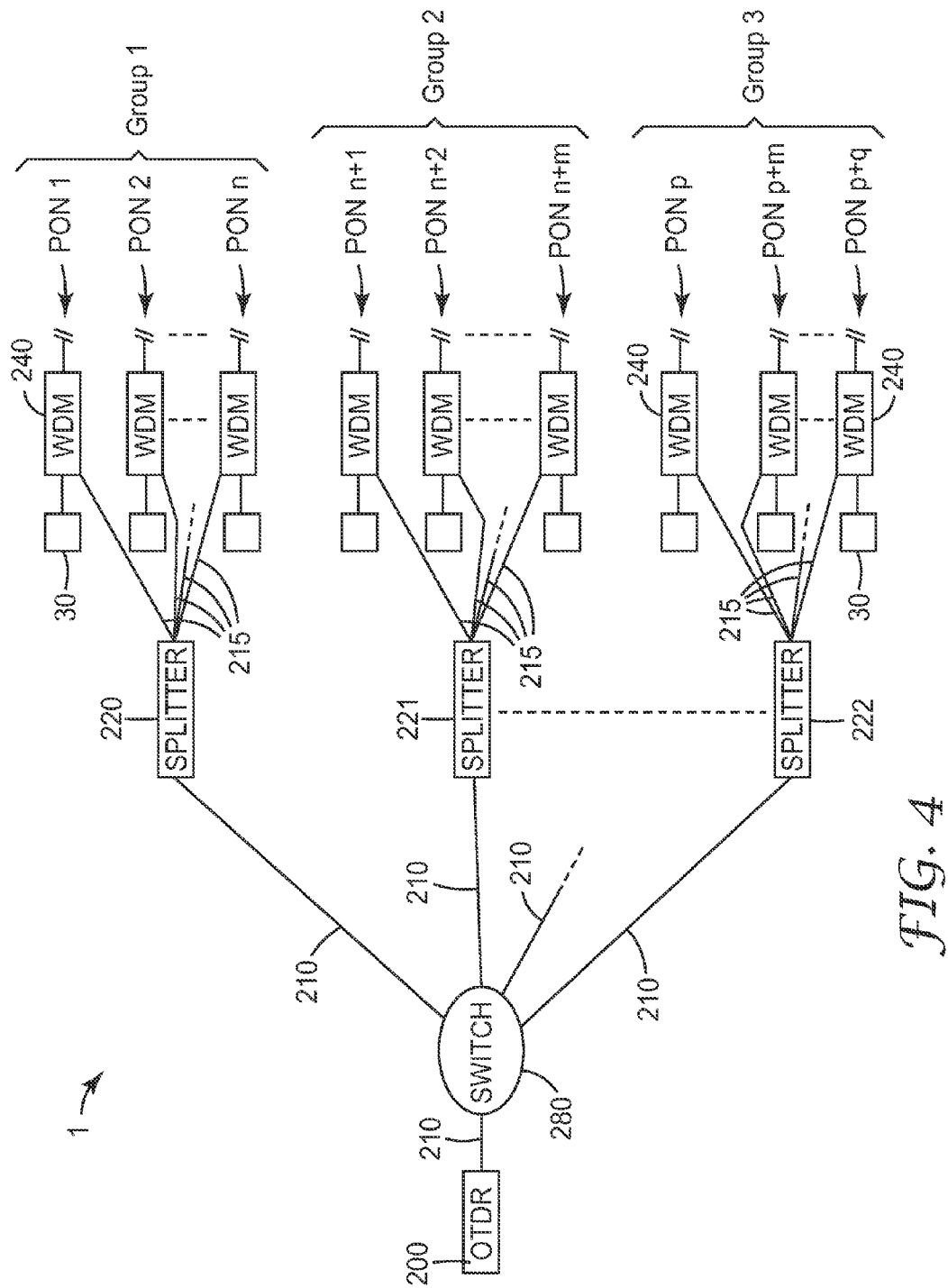
FIG. 4 Schematic network diagram of a further fibre network according to the invention, comprising a switch.

A further fibre-optic network 1 according to the invention is shown in the schematic network diagram of FIG. 4. In the fibre network 1, several PONs form a group of PONs. The first group comprises n PONs, the second group comprises m PONs, the third group q PONs. The fibre network comprises k groups of PONs. Each group has a query signal splitter 220, 221, 222. All the query signal splitters 220, 221, 222 are optically connected, via an optical switch 280, to the OTDR 200 on one side and to the PONs of the group on the other side. Each query signal splitter 220, 221, 222 can feed query signals from the OTDR 200 into the PONs of its group simultaneously and it can feed response signals from the PONs of its group into the OTDR 200. All the PONs of a group are connected to the OTDR 200 through a single query signal splitter 220, 221, 222. PONs within a group are interrogated simultaneously in the same way as shown in FIG. 2 or FIG. 3. Groups of PONs, however, are interrogated sequentially by a single OTDR 200. This is achieved by the optical switch 280, optically arranged between the OTDR 200 on one side and the query signal splitters 220, 221, 222 on the other side. The switch 280 can assume various positions. In one position, the switch 280 can feed a query signal from the OTDR 200 into a single one of the query signal splitters 220, 221, 222 and further into the group of PONs optically connected to that query signal splitter 220, 221, 222. The switch 280 can also feed response signals from that group of PONs and from the one query signal splitter 220, 221, 222, to which the PONs of that group are connected, into the OTDR 200.

The optical switch 280 can optically connect the OTDR 200 to only one single group of PONs at a time. The OTDR 200 can thus simultaneously interrogate only the fibre-optic sensors 100 within the one group of PONs, that is currently connected to the OTDR 200 by the switch 280. For interrogating sensors 100 in a different group of PONs, the switch 280 can be operated to optically connect the OTDR 200 to the query signal splitter 220, 221, 222, to which the PONs of that different group are optically connected. Operating the switch 280 takes time. Sensors 100 in one group of PONs can therefore only be interrogated after sensors in a different group of PONs have been interrogated. The switch needs to be operated k times before all the sensors in all k groups of PONs have been interrogated. The fibre network 1 shown in FIG. 4 is therefore particularly suitable for interrogating sensors 100 in groups of PONs, which require less frequent interrogation than the sensors 100 of the fibre network 1 shown in FIG. 2.

FIG. 5a is a schematic top view of an embodiment of the fibre-optic sensor 100 of FIG. 2, which can be used in a fibre network 1 according to the present disclosure. Dimensions are not to scale, and some dimensions are exaggerated for clarity. The sensor 100 shown in FIGS. 5a and 5b is a passive fibre-optic door sensor, which can detect if a door 300 is open or closed. The door 300 can be opened and closed by rotating it about a hinge 310. The hinge axis is vertical and perpendicular to the plane of the drawing. The door 300 is shown in a closed position in FIG. 5a. An arrow 320 indicates the direction of rotation of the door 300, when the door 300 is brought from the closed position into an open position. An arm 330 is fixed to the door 300, so that the door 300 is arranged on one side of the hinge 310, and the arm 330 is arranged on the opposite side of the hinge 330, such that, when the door 300 rotates about the axis of the hinge 310, the arm 330 rotates about the same axis. The arm 330 is in contact with a movable sensor actuator 340. When the door 300 is opened, the arm 330 pushes the sensor actuator 340 towards a counter element 350. The actuator 340 has an actuator surface 360 which is convexly curved, and the counter element 350 has a corresponding counter surface 370, which is concavely curved such that the convex actuator surface 360 and the concave counter surface 370 correspond to each other, and so that a large portion of the concave counter surface 370 contacts a large portion of the convex actuator surface 360 with no space remaining between the contacting portions of the surfaces 360, 370, when the sensor actuator 340 is pushed onto the counter element 350 when opening the door 300.

The sensor actuator 340 and the counter element 350 are arranged on opposite sides of the sensor fibre 110. When the door 300 is closed, as shown in FIG. 5a, the arm 330 does not push the sensor actuator 340 onto the counter element 350, and the sensor fibre 110 between them is not deformed by the sensor actuator 340 and the counter element 350, so that the sensor fibre 110 remains straight. A query signal, propagating in the sensor fibre 110 towards the reflector 120 is thus not attenuated. After reflection, the query signal is again not attenuated when passing by the sensor actuator 340 and the counter element 350. The query signal is now the response signal, which is transmitted back to the OTDR 200. The sensor 100 is in its "normal" state when the door 300 is closed.

The door sensor 100 of FIG. 5a is shown in FIG. 5b, with the door 300 being now open. The sensor 100 is in an "activated" state. Opening of the door 300 causes rotation of the arm 330 about the hinge 310. The arm 330 thereby pushes the sensor actuator 340 and the sensor fibre 110 towards and onto the counter element 350. The sensor fibre 110 is thereby deformed. It is brought into the curved shape of the counter surface 370 of the counter element 350. The curvature of the actuator surface 360 and the corresponding curvature of the counter surface 370 are chosen such that the sensor fibre 110 is bent to a radius which is small enough to cause attenuation of the query signal propagating in the sensor fibre 110, when the door 300 is open. The attenuation caused by bending of the sensor fibre 110 affects the wavelengths of the query signal. When the door 300 is open, the sensor fibre 110 is thus deformed. The sensor 100 is therefore in an "activated" state. Once the attenuated query signal is reflected at the reflector 120, it propagates in the sensor fibre 110 back towards the second WDM 250, thereby passing the bent portion of the sensor fibre 110, i.e. the portion between the sensor actuator 340 and the counter element 350, a second time. It is attenuated a second time in the bent portion. The query signal is now the response signal, which is transmitted back to the OTDR 200. The query signal is thus attenuated twice by the sensor 100. The OTDR 200 can determine the amount of attenuation by comparing the intensity of an unattenuated response signal from the sensor 100 (shown in FIG. 5a) with the intensity of an attenuated response signal from the same sensor 100 (shown in FIG. 5b). The OTDR 200 can thereby determine if the latest response signal received from the sensor 100 indicates a "normal" or an "activated" state of the sensor 100.

The sensor 100 can alternatively be built such that the query signal in the sensor fibre 110 is attenuated when the sensor 100 is in a normal state, i.e. when the door 300 is closed, and unattenuated when the sensor 100 is in an activated state, i.e. when the door 300 is open. When the door 300 is brought from a closed state into an open state, the sensor 100 is brought from a normal state into an activated state, and the OTDR 200 could again detect a change in the attenuation properties of the sensor fibre 110.

The invention claimed is:

1. Fibre network for interrogating fibre-optic sensors in a first Passive Optical Network (PON) and in a second PON, the fibre network comprising
    a test signal transceiver for emitting query signals and for receiving response signals, wherein the response signals originate from the query signals,
    a first PON comprising a first light source for generating first telecommunication signals and comprising a first fibre-optic sensor,
        wherein the first PON is adapted to transmit the first telecommunication signals to a plurality of subscribers, and wherein the first PON is optically connected to the test signal transceiver such that query signals from the test signal transceiver can be fed into the first PON and propagate in the first PON to the first fibre-optic sensor, and such that the test signal transceiver can receive response signals from the first fibre-optic sensor through the first PON,
    a second PON comprising a second light source for generating second telecommunication signals and comprising a second fibre-optic sensor, wherein the second PON is adapted to transmit the second telecommunication signals to a plurality of subscribers, and wherein the second PON is optically connected to the test signal transceiver such that query signals from the test signal transceiver can be fed into the second PON and propagate in the second PON to the second fibre-optic sensor, and such that the test signal transceiver can receive response signals from the second fibre-optic sensor through the second PON, wherein the fibre network further comprises a query signal splitter, for feeding a query signal, emitted by the test signal transceiver, into the first PON and the second PON simultaneously, and for feeding response signals from the first PON and second PON into the test signal transceiver, wherein the query signal splitter is optically connected to the test signal transceiver and to the first and second PONs such that the query signal splitter can feed one query signal, emitted by the test signal transceiver, into the first PON and the second PON simultaneously, and such that the query signal splitter can feed response signals from the first PON and second PON into the test signal transceiver,
        wherein the query signal splitter is a power splitter, wherein the first and/or the second fibre-optic sensor is optically connected to the PON, which comprises the respective fibre-optic sensor, by a sensor fibre, wherein the sensor fibre comprises a reflector at a far end of the sensor fibre, and wherein the query signal splitter is a symmetric splitter and has a splitting ratio of 1:4, 1:8, 1:16, 1:32, of 1:64, or higher.

2. Fibre network according to claim 1, wherein the first PON or the second PON is adapted such that the query signal and the first or second telecommunications signals travel in a same fibre of the first PON or the second PON over at least a segment of the fibre.

3. Fibre network according to claim 1, wherein the query signal splitter is adapted to feed an optical query signal, emitted by the test signal transceiver, into the first PON with higher power than it feeds the optical query signal into the second PON.

4. Fibre network according to claim 1, wherein the reflector is adapted to selectively reflect one or two wavelengths of light travelling in the sensor fibre.

5. Fibre network according to claim 1, wherein the query signal has a specific wavelength spectrum, and wherein the reflector is adapted to selectively reflect light having wavelengths within the wavelength spectrum of the query signal, and transmit light having wavelengths outside the wavelength spectrum of the query signal.

6. Fibre network according to claim 1, wherein the fibre network further comprises a signal coupling device, adapted such and optically arranged in the first PON or in the second PON such that the signal coupling device can feed a query signal into the sensor fibre towards the respective first or second fibre-optic sensor.

7. Fibre network according to claim 6, wherein the signal coupling device is a wavelength-dependent signal coupling device or a wavelength division multiplexer (WDM).

8. Fibre network according to claim 1, wherein the first or the second fibre-optic sensor is optically connected to the PON, which comprises the respective fibre-optic sensor, by a respective sensor fibre, and wherein the fibre-optic sensor comprises an actuator, adapted to deform at least a segment of the sensor fibre such, that the deformation of the sensor fibre causes a change in the optical attenuation of a query signal propagating in the sensor fibre.

9. Fibre network according to claim 1, wherein the fibre-optic sensor is a passive sensor.

10. Fibre network according to claim 1, wherein the test signal transceiver, the first PON and the second PON, the first and the second fibre-optic sensors and the query signal splitter are adapted such that the first fibre-optic sensor and the fibre-optic second sensor can be repeatedly interrogated by the test signal transceiver at time intervals of 10 seconds or less between two subsequent interrogations of the same fibre-optic sensor.

11. Fibre network according to claim 1, comprising one or more further PONs, each further PON comprising a respective light source for generating respective telecommunication signals and comprising a respective fibre-optic sensor, wherein each further PON is adapted to transmit the respective telecommunication signals to a plurality of subscribers, and wherein each further PON is optically connected to the test signal transceiver such that query signals from the test signal transceiver can be fed into the further PON and propagate in the further PON to the respective fibre-optic sensor, and such that the test signal transceiver can receive response signals from the respective fibre-optic sensor, and wherein the query signal splitter is adapted for feeding a query signal, emitted by the test signal transceiver, into the first PON, the second PON and the further PON(s) simultaneously, and for feeding response signals from the first PON, the second PON and the further PON(s) into the test signal transceiver, and wherein the query signal splitter is optically connected to the test signal transceiver and to the first PON, the second PON and the further PON(s) such that the query signal splitter can feed a query signal, emitted by the test signal transceiver, into the first PON, the second PON and the further PON(s) simultaneously, and such that the query signal splitter can feed response signals from the first PON, the second PON and the further PON(s) into the test signal transceiver.

* * * * *